US00RE34662E

United States Patent [19]

Keller

[11] E Patent Number: Re. 34,662

[45] Reissued Date of Patent: Jul. 19, 1994

[54] DUAL-HEIGHT WADER

[76] Inventor: Robert W. Keller, 10760 Bill Point Dr., Bainbridge Island, Wash. 98110

[21] Appl. No.: 862,794

[22] Filed: Apr. 3, 1992

Related U.S. Patent Documents

Reissue of:

[64] Patent No.: 4,912,860
Issued: Apr. 3, 1990
Appl. No.: 358,635
Filed: May 30, 1989

[51] Int. Cl.[5] ..... A41D 13/02

[52] U.S. Cl. ..... 2/82; 2/79; 2/227; 36/4

[58] Field of Search ..... 2/2.1 R, 82, 79, 227, 2/81; 36/4

[56] References Cited

U.S. PATENT DOCUMENTS

| | | | |
|---|---|---|---|
| 495,450 | 4/1893 | Braunwarth | 36/4 |
| 848,821 | 4/1907 | Glidden | 36/4 |
| 1,794,144 | 2/1931 | Brown | 36/4 |
| 1,975,597 | 10/1934 | Berry | 36/4 |
| 2,087,246 | 7/1937 | Edwards | 2/82 |
| 2,462,239 | 2/1949 | Van Dinter et al. | 36/4 |
| 2,473,099 | 6/1949 | Hatch | 36/4 |
| 2,483,136 | 9/1949 | Hamman et al. | 2/82 |
| 3,329,966 | 7/1967 | Slavick | 2/2.1 R |
| 3,493,972 | 2/1970 | Oldham | 2/2.1 R |
| 3,763,498 | 10/1973 | Rector | 2/2.1 R |
| 4,117,609 | 10/1978 | Helt | 36/4 |
| 4,535,477 | 8/1985 | Musto et al. | 2/2.1 |
| 5,022,096 | 6/1991 | Pacanowsky | 2/82 |
| 5,081,718 | 1/1992 | Carman et al. | 2/79 |
| 5,088,116 | 2/1992 | Gould | 2/79 |

FOREIGN PATENT DOCUMENTS

| | | | |
|---|---|---|---|
| 14859 | 10/1915 | United Kingdom | 36/4 |
| 304988 | 1/1929 | United Kingdom | 36/4 |
| 2125681 | 8/1983 | United Kingdom | 2/82 |
| 2166039 | 11/1984 | United Kingdom | 2/2.1 R |

*Primary Examiner*—Clifford D. Crowder
*Assistant Examiner*—Gloria Hale
*Attorney, Agent, or Firm*—Knobbe, Martens, Olson & Bear

[57] ABSTRACT

Disclosed is a wader for use in fishing and other activities having a body portion covering the lower body (including the legs, feet, hips, and waist of the wearer), and a chest portion normally folded inside the body portion but extendable upward about the chest, but not the shoulders of the wearer. The chest portion is preferably held about the chest by a drawstring, such as an elastic drawstring, and is advantageously biased into the lowered position inside the body portion by mans of a seam joining the two portions.

35 Claims, 3 Drawing Sheets

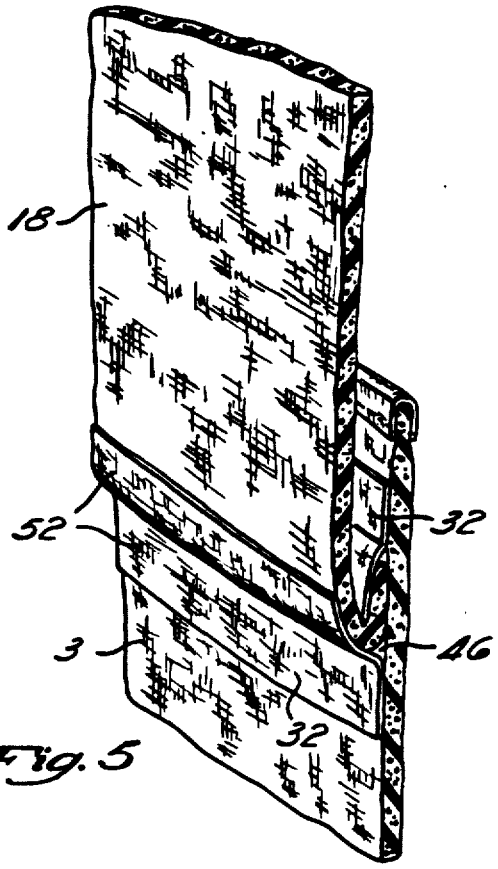
Fig. 5
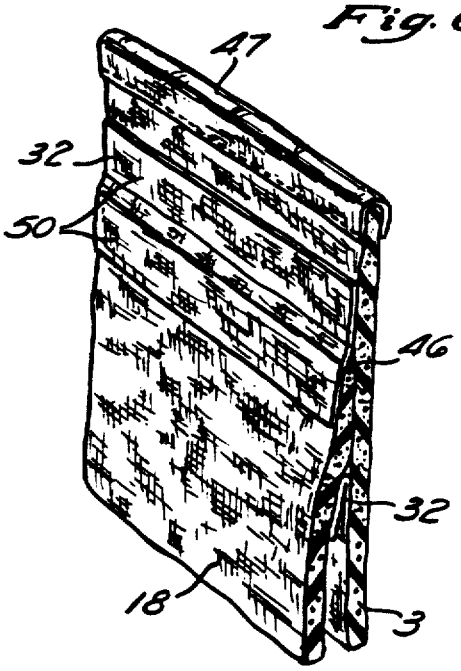
Fig. 6
Fig. 7
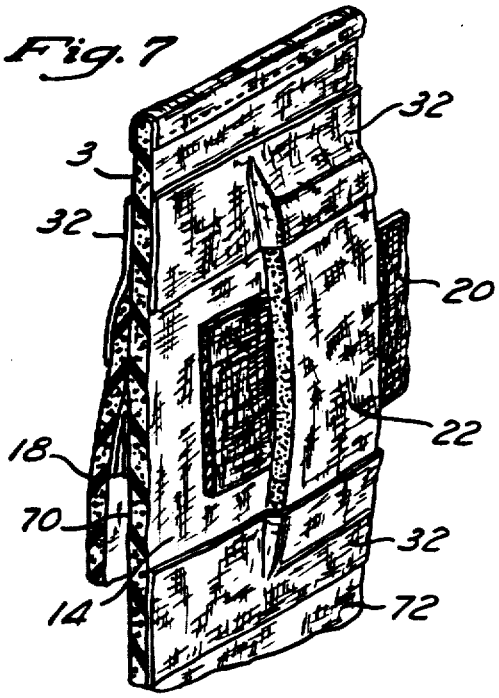

DUAL-HEIGHT WADER

Matter enclosed in heavy brackets [ ] appears in the original patent but forms no part of this reissue specification; matter printed in italics indicates the additions made by reissue.

BACKGROUND OF THE INVENTION

The present invention relates to protective, water-resistant clothing and particularly relates to a type of protective clothing known as waders, used in conjunction with a variety of water sports such as fishing; yet it is understood that the present invention is also usable in non-water related activities, where body protection from the elements is desired.

The use of wader-type protective clothing in conjunction with water sports such as fishing or crabbing, and specifically fly fishing, is well known and widely adopted. The waders are generally manufactured of a waterproof fabric. One type of wader, generally referred to as a "hip boot" style, is two boots which extend up to the thigh and are generally supported by attaching them to the wearer's belt. A second style of wader is the waist-high wader. These waders are generally a one-piece wader that extends up to and sometimes slightly above the waist of the wearer. Finally, there is a full chest wader, that extends up to the armpits of the wearer and is typically supported by shoulder straps.

The environmental condition faced by the user of such waders is normally the decisive factor as to whether the user shall wear the waist-high or chest-high version in his sporting endeavor. A sportsman using the waders in high water levels, low air temperatures, or foul weather conditions may desire to use the chest-high version for its increased warmth and protective qualities relative to the waist-high version. On the other hand, a sportsman desiring protection in shallower water or relatively higher air temperatures may desire to use hip waders or waist-high waders. However, sportsmen in general and fly fishermen in particular learn to anticipate a variety of conditions in any one expedition. They may find themselves having to go through deep water at one point in the day, but may spend most of the day in shallower water. Often, a sunny, warm day develops into a cold day as weather fronts move through. Such changing conditions often make the choice of wader an unsatisfactory compromise.

Additionally, the chest-high waders, with their shoulder straps and additional bulk, generally limit the user's freedom of movement (for instance when rowing a raft or drift boat or carrying or lifting an object) and are cumbersome and time-consuming to remove. Therefore, in situations where maximum freedom of movement is required, a user would be inclined to use the waist-high version, even if environmental conditions dictate otherwise.

To circumvent the inherent mobility and temperature retentive problems associated with the chest-high waders, many sportsmen wear the chest-high waders in all environmental conditions, yet disconnect them at the shoulder straps and fold or roll them down on top of and over the wader to produce a waist-high model when conditions dictate, with the shoulder straps and bib or chest-protecting area hanging loosely beneath or rolled into a "spare tire" about the torso. This situation is problematic for the sportsman, as the bulky, heavy chest-high waders are not adapted for use without support from the shoulders. Thus, they are difficult to keep up when in this configuration. More importantly, the sportsman may find the dangling or bulky chest and shoulder portions interfering with his sporting endeavor. Although this can be a problem in many sporting uses of waders, fishermen in particular often cannot afford to have such extraneous matter hanging from his clothing. The loose, hanging material comprising the chest and shoulder portion of the waders will tend to interfere with the use of the fisherman's equipment. Moreover, when wading in even knee-high water, the folded down chest and shoulder portion will tend to drag in the water.

Accordingly, it is an object of the present invention to provide an improved wader providing full freedom of movement while being adaptable to varying conditions of temperature and water depth.

SUMMARY OF THE INVENTION

Thus, in accordance with one aspect of the present invention, there is provided a waterproof wader system, adjustable to provide varying degrees of user body protection, comprising a first portion comprising a waist-high wader, and a second extendable chest protective portion connected to the first portion, the second portion adapted to be worn in both a first lowered position folded inside the first portion and a second extended position extending upwardly from the first portion over a user's upper chest area.

In accordance with another aspect of the present invention, there is provided a waterproof wader garment, comprising a body portion for covering the feet, legs and waist of a wearer, and a chest portion, wherein the body portion is joined to the chest portion in a waterproof manner, and the chest portion is adapted to both hang downwardly in a lowered position inside the body portion and to extend upwardly from the body portion over a wearer's chest area in a raised position, and a means for securing the chest portion in the raised position without extending the securing means over the shoulders of a wearer. In one embodiment, the securing means comprises a drawstring at the top of the chest portion that encircles a wearers chest under the armpits. The drawstring may advantageously be made of elastic material. Also, in a preferred embodiment, the wader is made of foam neoprene and the neoprene of the body portion is thicker than that of the chest portion.

One particularly preferred construction of the wader includes means normally biasing the chest portion into the lowered position. The biasing means in one embodiment comprises a seam joining the chest portion to the body portion, wherein the material of which the wader is made reverses direction at the seam, thereby biasing the chest portion into the lowered position.

In accordance with still another embodiment of the invention, there is provided a waterproof wader garment, comprising a body portion for covering the feet, legs and waist of a wearer, and a chest portion made of material thinner than that of the body portion, wherein the body portion is joined to the chest portion in a waterproof manner, and the chest portion is adapted to both hang downwardly in a lowered position inside the body portion and to extend upwardly from the body portion over a wearer's chest area in a raised position. In this embodiment as well, the wader material may comprise foam neoprene, in whole or in part. This material may advantageously be lined, as with fabric of nylon or spandex. Alternatively, the wader may be made in whole or in part of water-impermeable, vapor permeable material, including any of the well-known breathable waterproof materials. Some of the recently developed stretchable waterproof fabrics, such as waterproof spandex, can also be used. The wader preferably includes means for securing the chest portion in the raised position around the chest of a wearer. This securing means can comprise a drawstring extending around the chest portion, preferably an elastic drawstring. In one embodiment, the body portion includes a pair of boots attached thereto in a waterproof manner. The wader also preferably includes means for holding the wader up when the chest portion is in the lowered position. The holding means may comprise, for example, a belt, and belt loops may be provided on the wader to facilitate that construction.

BRIEF DESCRIPTION OF THE DRAWINGS

FIG. 5 is a partial section taken along the line 5—5 in FIG. 3, illustrating the seam joining the lower portion and the chest portion of the wader when the chest portion is in the extended position.

FIG. 6 corresponds to FIG. 5, except that the chest portion is in the lowered position.

FIG. 7 corresponds to FIG. 6, except that the view is taken in the opposite direction (from the outside instead of the inside of the wader) and illustrates the belt and belt loop at the top of the lower portion of the wader.

DETAILED DESCRIPTION OF THE PREFERRED EMBODIMENT

Figure 1:
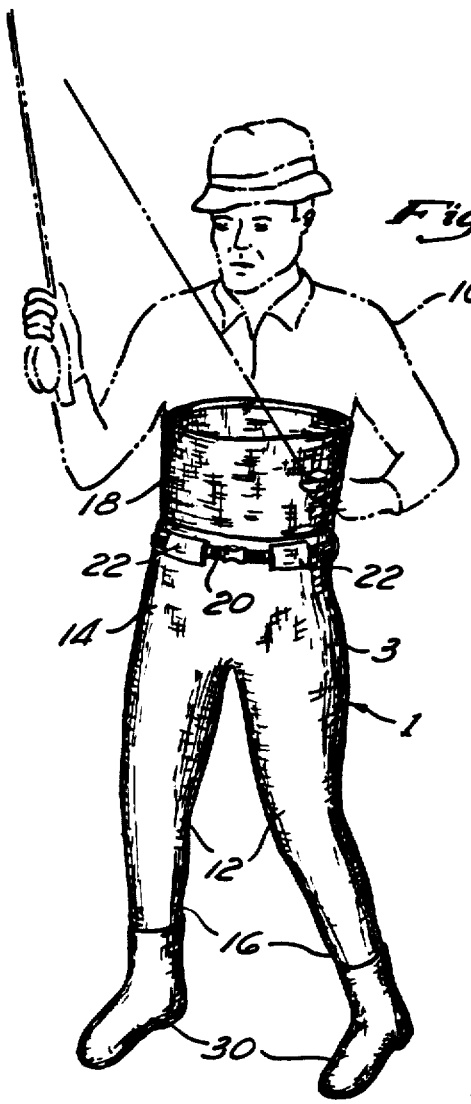
FIG. 1 is a perspective view of a wearing the wader of the present invention with the chest portion in the extended position.

One preferred embodiment of the instant invention is depicted in FIG. 1, wherein a sportsman user 10, in this instance a fisherman, is depicted wearing a wader 1 in its extended or chest-high position. The wader 1 comprises two portions: a lower or body portion 3, and a chest portion 18. The body portion 3 has two legs 12, a waist 14, feet 16, and a chest portion 18. The waist area 14 preferably has associated with it a device to hold the wader 1 on the user's body 10, most preferably a belt 20.

The belt 20 may be contained within belt loops 22 located around the waist 14 of the wader 1, as best illustrated in FIG. 7. Such loops 22 function to hold the belt 20 about the waist 14 in a position adapted to support the waders 1 on the user's body 10.

The chest portion is adapted to be folded inside of the body portion 3 when chest protection is not desired by the wearer. Thus, the chest portion 18 fits inside the body portion 3 in a lowered or retracted position. Additionally, the chest portion 18, as shown in phantom line 24 in its extended position in FIG. 2, may be attached separately, or may be integral with the body portion 3. However, in either event, it is joined to the body portion 3 in a waterproof manner. The chest portion 18, in its retracted position, is preferably folded or tucked as to be extended downwardly into the waist 14 of the wader 1, next to the user's body.

Figure 2:
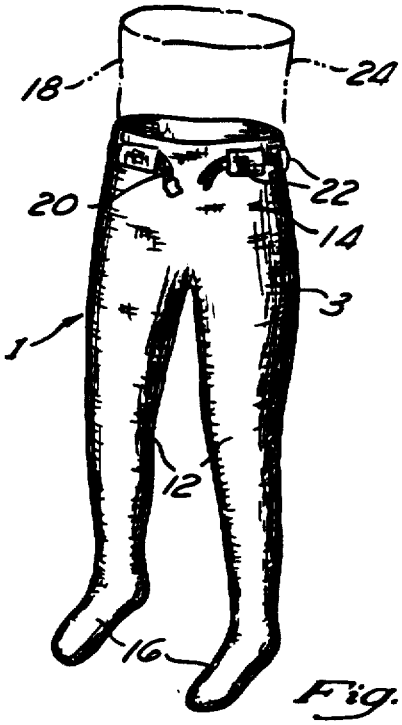
FIG. 2 is a perspective view of the wader with the chest portion in the lowered position.

The wader 1 may be constructed in a stocking foot model, as depicted in FIG. 2, wherein the wader 1 is continuous in material construction throughout the legs 12 and into the feet 16, configured as to allow for insertion of the feet 16 into an appropriate boot or shoe.

Alternatively, the wader 1 may be constructed in a boot foot model, wherein the legs 12 terminate in boots 30, as depicted in FIG. 1, wherein the boots 30 may be integrally attached to the legs 12 to produce a waterproof seal.

The wader 1 may be constructed of any of a number of durable, natural or synthetic, waterproof or waterproofable materials or combinations of materials. In a preferred embodiment, the wader 1 may be comprised of a semi-elastic or elastic material such as a foam neoprene and, most preferably nylon-lined or spandex-lined foam neoprene. Any type of lining material appropriate for use next to the body or clothing of the user which preferably allows for ease of getting into and out of the wader 1 and for comfort in user 10 movement and wearing is contemplated for use in the instant invention. At the same time, it is also advantageous to provide lining material on the outside of the wader to increase the durability and snag resistance of the wader. Alternatively, a breathable waterproof material, such as that sold under the trademark "Goretex," may be used in an embodiment requiring a more supple, less insulating wader. Most breathable materials are not stretchy or elastic; thus, this characteristic is often sacrificed if a breathable fabric is substituted for the foam neoprene. However, it is contemplated that presently available and yet-to-be introduced stretchable waterproof materials, such as the commercially available waterproof spandex, can also be used to advantage in the present invention.

The foam neoprene of the wader 1 body portion 3 preferably has a thickness which maximizes the comfort of the user 10, yet provides the desired degree of strength and warmth appropriate required to protect the user 10 from the environmental conditions encountered. In a preferred embodiment, the neoprene thickness in the body portion 3 of the wader 1 may be between about 3–5 mm, with a preferable thickness of 3 mm. However, thicker or thinner neoprene may be used, depending on the freedom of body movement desired, environmental temperatures during use and/or desired degree of wader 1 durability. Additionally, areas of the wader 1 may be reinforced with additional layers of neoprene, to provide greater strength and durability.

The wader 1 is preferably constructed from a minimum number of individual pieces, thereby reducing labor and the amount of waterproof seams required in manufacture. This in turn will tend to increase the integrity and waterproof characteristics of the wader 1. The seams 46 of the wader, as depicted in FIG. 5, may be joined and waterproofed in any of a variety of commercially available and/or manufacturing methods, with the seams 46 preferably waterproofed and sealed together with an heat activated adhesive tape 32 comprising a urethane backing. One suitable tape is commercially available under the trademark MELCO, marketed by Turbo Trading International, of Kobe, Japan. Tapes such as these provide a durable and effective waterproof seal, are lightweight, and are relatively thin, so as not to produce any unsightly seams or functionally problematic areas.

Figure 3:
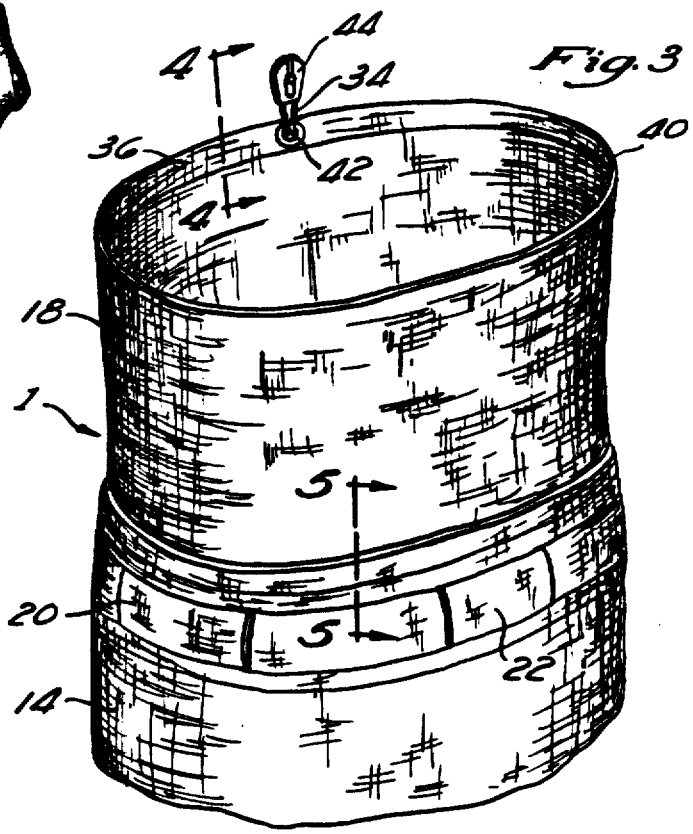
FIG. 3 is a perspective detail view of the chest portion of the wader in the extended position.

The chest portion 18 of the wader 1 is preferably comprised of the aforementioned waterproof or waterproofable materials or substances; preferably neoprene and, most preferably, nylon or spandex lined foam neoprene. However, waterproof fabric such as nylon or a urethane coated nylon may also be used when reducing bulk is more important than providing an elastic chest portion 18 that can accommodate different individuals or movement-related changes in chest diameter. Referring to FIG. 3, there is depicted a perspective view of the chest portion 18 and waist 14 of the wader 1. The chest portion 18 may be integral with the wader body 3, and may be constructed with the waist 14 in one unitary, continuous piece of material. However, in the preferred alternative, the chest portion 18 is attached as a separate neoprene sleeve inside of the wader 1 at or around the waist 14.

One significant and preferred aspect of the present invention requires that the seam 46 is constructed in such a manner that it biases the chest portion 18 of the wader 1 into the lowered or retracted position inside of the body portion 3 of the wader 1. This construction is best illustrated in FIGS. 5 and 6. In FIG. 6, the seam 46 joining the body portion 3 and the chest portion 18 of the wader 1 is constructed in such a manner that the material of which the wader 1 is made reverses direction at the seam 46. Thus, in FIG. 6, the body portion 3 material extends up to the seam 46, and then the chest portion 18 material extends down from the seam. The seam itself holds the respective materials in these relative positions in the normal or unstressed state. When the body portion 3 is pulled up into the extended position, however, the material of which it is made must fold back upon itself, in opposition to the natural elastic tendencies of the foam neoprene to remain in a relatively flat configuration. Folding the chest portion 18 into the inside of the body portion 3 is thus facilitated by the natural bias of the seam 46. This construction minimizes the bulk of the seam 46 when the chest portion 18 is in this position.

Any suitable thickness may be chosen for the material making up the chest portion 18. However, the chest portion 18 material preferably has a thickness less than that of the wader body 3 material, in order to minimize the bulk of the wader around the users waist when the chest portion 18 is in the lowered position. In a preferred embodiment, the chest portion is made of neoprene having a thickness of approximately 1.5 mm.

The chest portion 18 may be of a length which allows for a complete upward extension of the sleeve from its point of attachment of the waist 14 up to approximately the chest or armpit area of the user 10. The waist 14 is thus located at least half way between the crotch of the wader 1 and the armpit area of the user, so that the chest portion 18 may be short enough to fit inside the top of the body portion 3 without bunching at the top of the leg area.

In assembly, the chest portion 18 may be attached to the outside or inside of the wader body portion 3. However, it is preferably attached to the inside of the wader 1, as not to interfere with the wader 1 function when worn by a user 10 in its waist-high configuration. In addition, when the chest portion 18 is attached to the inside of the body portion 3, folding of the chest portion into the body portion 3 is facilitated. It is preferred that the chest portion 18 be attached to the very top of the body portion 3. However, one may also attach the chest portion 18 to a point both inside of the body portion 3 and below the top of the body portion 3, as shown in FIGS. 5 and 6. The attachment point for the chest portion may thus be ½ inch, and as much as ¾ inch or 1 inch below the top of the body portion 3.

There are various methods contemplated for constructing the seam 46 between the chest portion 18 and the body portion 3. One such method is illustrated in FIGS. 5 and 6. Referring to FIG. 6, the chest portion 18 is attached with the seam 46 associated with the wader body portion 3 near the waist 14 of the wader body portion 3. Preferably, the chest portion 13 is initially glued to the body portion 3, and is then securely attached to the body portion 3 by a heat activated urethane backed tape 32 applied to the seam 46 at the point of juncture between body portion 3 and the chest portion 18, at the front side 50 of the seam 46, as depicted in FIG. 6. The chest portion 18 is preferably attached to the body portion 3 in its retracted or downward position.

Next, referring to FIG. 5, the chest portion 18 is lifted up in its extended position, and the back side 52 of the seam 46 is then sealed by another application of the heat activated, urethane backed tape 32, as to produce a water-tight seal along the area of association between the chest portion 18 and the body portion 3 of the wader 1.

Referring to FIG. 7, there is represented a perspective cross-sectional view of the outer surface 72 of the waist 14 of the wader 1, depicting a belt loop 22 and belt 20, said belt 20 extending between the belt loop 22 and the waist 14. On the inner surface 70 there is depicted the chest portion 18 attached to the body portion 3 in its retracted position. The belt loops 22 may be attached to the waist 14 of the wader 1 in any of a variety of commercially available methods, such as through the use of a waterproof adhesive, by use of heat-activated urethane-backed adhesive tape 32, or both. The belt loops 22 may be manufactured of any material sufficient to provide adequate strength and durability to hold the belt 20 in place during the stress and strain of the wader 1 use, and are preferably comprised of the same nylon-backed neoprene foam comprising the body portion 3. Preferably, the nylon backing of the neoprene foam faces the body portion 3 of the wader allowing for ease of belt 20 movement through the belt loops 22.

Figure 8:
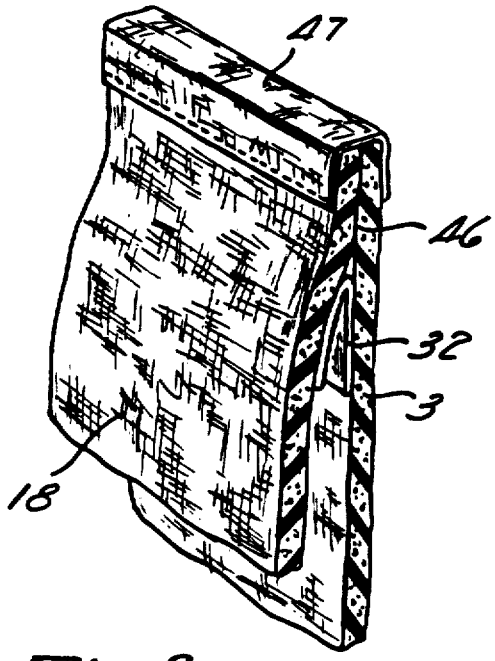
FIG. 8 is a partial section taken along the line 5—5 in FIG. 3, except that the chest portion is lowered, and illustrates an alternative method for joining the chest portion to the wader.

A preferred alternative method for making the junction between the body portion 3 and the chest portion 18 is illustrated in FIG. 8. In this method, the top of the body portion 3 is first glued to the top portion 18 in the area of the seam 46. Then, spandex tape 47 is wrapped over the abutting edges of the body portion 3 and chest portion 18 and is sewn in place, firmly joining the two portions. Thereafter, the chest portion 18 is raised into its extended position and heat activated tape 32 is applied to the thus-exposed underside of the seam 46, in the same manner as explained in connection with FIGS. 5 and 6.

Figure 9:
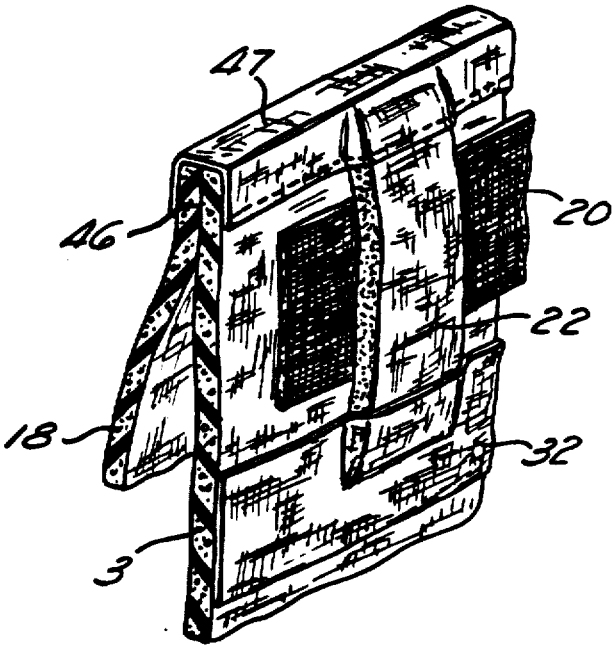
FIG. 9 corresponds to FIG. 8, except that the view is taken in the opposite direction (from the outside instead of the inside of the wader) and illustrates the belt and belt loop at the top of the lower portion of the wader.

A variation of the technique for attaching the belt loop 22 to the waders 1 is shown in FIG. 9. Instead of using heat activated tape to attach the top of the belt loop, as shown in FIG. 7, the top can be sewn in place under the spandex tape 47, as illustrated in FIG. 9. The belt loop 22 is preferably glued in place prior to sewing the top end thereof into the seam 46.

Additionally, the belt 20 may be made of any of a variety of materials which provide adequate strength and durability as to hold the wader 1 upon the body of the user 10. Preferably, the belt 20 may be woven nylon or other polymer material, and may have associated with it a conventional fastening or buckling mechanism. This mechanism is preferably non-metallic or corrosion-resistant and or water-resistant, thereby providing for ease of adjustment and secure fastening of the belt 20 around the user 10.

Figure 4:
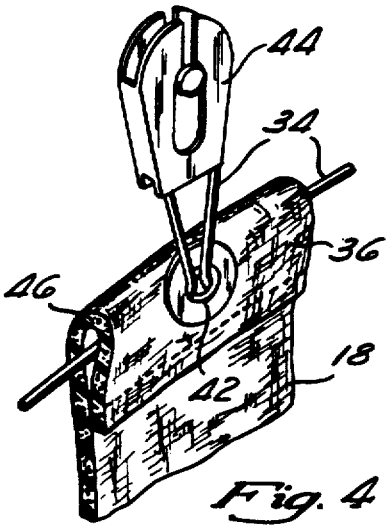
FIG. 4 is a partial section taken along the line 4—4 in FIG. 3, illustrating the drawstring and adjacent wader material in the chest portion of the wader.

As depicted in FIG. 1, the chest portion 18 may have a length which allows for a comfortable range of motion of the user 10, while the chest portion 18 is worn in its extended position. Referring to FIG. 3, the chest portion 18 may be secured in its extended position around the user's chest by any of a number of commercially available means, including belts, cord ties or velcro; most preferably an elastic shock cord draw string 34. The draw string 34 may be held within a sleeve 46 formed by a folding the uppermost edge 40 of the chest portion 18 around and into the extended portion of the chest portion 18. As shown in FIG. 4, the draw string 34 extends out through a grommet hole 42 to the inside of the chest portion 18 in its extended position next to the user's body, to avoid draw string 34 interference with any other clothing or paraphernalia that the user 10 may be carrying. The material making up the sleeve holding the draw string 34 is preferably stitched around the circumference of the outer edge of the chest portion, and may be attached and held there by use of waterproof tape. The draw string 34 extends through a fastener 44 which allows for secure and convenient loosening or tightening of the draw string 34 around the chest portion 18 to compensate for the body size of the wearer and ensure a comfortable fit.

As an alternative to the draw string 34, the chest portion 18 may be held in place when in the extended position through the use of simple shoulder straps.

What is claimed is:

1. A waterproof wader system, adjustable as to provide varying degrees of user body protection, comprising:

a first portion comprising a waist-high wader; and a second extendable chest protective portion connected to said first portion, said second portion adapted to be worn in both a first lowered position folded inside said first portion and a second extended position extending upwardly from said first first portion over a user's upper chest area.

2. A waterproof wader garment, comprising:

a body portion for covering the feet, legs and waist of a wearer;

a chest portion, wherein said body portion is joined to said chest portion in a waterproof manner, and said chest portion is adapted to both hang downwardly in a lowered position inside said body portion and to extend upwardly from said body portion over a wearer's chest area [in raised position]; and a means for securing said chest portion in said raised position without extending said securing means over the shoulders of a wearer.

3. The wader of claim 2, wherein said securing means comprises a drawstring at the top of said chest portion that encircles a wearers chest under the armpits.

4. The wader of claim 3, wherein said drawstring is elastic.

5. The wader of claim 3, wherein said wader is made of foam neoprene and wherein the neoprene of said body portion is thicker than that of said chest portion.

6. The wader of claim 3, further comprising means normally biasing said chest portion into said lowered position.

7. The wader of claim 6, wherein said biasing means comprises a seam joining said chest portion to said body portion, wherein the material of which said wader is made reverses direction at said seam, thereby biasing said chest portion into said lowered position.

8. A waterproof wader garment, comprising:

a body portion for covering the feet, legs and waist of a wearer; and a chest portion made of material thinner than that of said body portion, wherein said body portion is joined to said chest portion in a waterproof manner, and said chest portion is adapted to both hang downwardly in a lowered position inside said body portion and to extend upwardly from said body portion over a wearer's chest area in a raised position.

9. The wader of claim 8, wherein said wader is made of waterproof material.

10. The wader of claim 9, wherein said waterproof material comprises foam neoprene.

11. The wader system of claim 9, wherein said neoprene is a lined neoprene.

12. The wader system of claim 11, wherein said lined neoprene is nylon-lined neoprene.

13. The wader system of claim 9, wherein at least a portion of said waterproof material is air-permeable.

14. The wader of claim 8, further comprising means for securing said chest portion in said raised position around the chest of a wearer.

15. The wader of claim 14, wherein said securing means comprises a drawstring extending around said chest portion.

16. The wader of claim 8, wherein said body portion includes a pair of boots attached to the remainder of said body portion in a waterproof manner.

17. The wader of claim 8, wherein said wader further comprises means for holding said wader up when said chest portion is in the lowered position.

18. The wader of claim 17, wherein said holding means comprises a belt.

19. The wader of claim 18, wherein said belt is held to said wader by belt loops.

20. A waterproof wader garment, comprising:

a body portion for covering the feet, legs and waist of a wearer; and a chest portion, wherein said body portion is joined to said chest portion in a waterproof manner, and said chest portion is adapted to both hang downwardly in a lowered position inside said body portion and to extend upwardly from said body portion over a wearer's chest area in a raised position, wherein said chest portion is joined to the body portion by a seam in such a manner that the chest portion is biased downwardly by said seam into the inside of said body portion.

*21. The wader of claim 18, wherein the second portion folds down and around the waist of said wearer, but remains above the belt of the first portion when said second portion is in the lowered position.*

*22. The wader of claim 18, wherein the upper portion folds down and around the waist of said wearer, but remains adjacent the belt of the first portion when said upper portion is in the lowered position.*

*23. A waterproof wader system, adjustable as to provide varying degrees of wearer body protection, comprising:*

*a first portion comprising a waist-high wader having a waist portion and a leg portion; and*

*a second extendable chest protective portion connected to said first portion, said second portion adapted to be worn in both a first lowered position folded around said wearer's waist, and a second extended position extending upwardly from said first portion over wearer's upper chest area.*

*24. The wader of claim 23, further comprising means for holding the first portion up when the second portion is in the lowered position.*

*25. The wader of claim 24, wherein the means for holding the first portion up comprises a belt secured to an upper region of the first portion so as to hold said upper region against the wearer's body and thereby support the first portion.*

*26. The wader of claim 25, wherein the second portion folds down and around the waist of said wearer, but remains adjacent the belt of the first portion when said second portion is in the lowered position.*

*27. The wader of claim 24, further comprising a drawstring disposed inside said second portion so as to encircle the wearer's chest under the armpits for securing said second portion in the second extended position without extending said drawstring over the shoulders of the wearer.*

*28. The wader of claim 27, wherein the first portion is thicker than the second portion.*

*29. The wader of claim 25, wherein the second portion folds down and around the waist of said wearer, but remains above the belt of the first portion when said second portion is in the lowered position.*

*30. A water proof wader garment, comprising:*

*a body portion for covering the feet, legs and waist of a wearer;*

*a chest portion, wherein said body portion is joined to said chest portion in a waterproof manner, and said chest portion is adapted to both fold downwardly in a lowered position around said wearer's waist, and to extend upwardly from said body portion over a wearer's chest area in a raised position; and*

*a means for securing said chest portion in said raised position without extending said securing means over the shoulders of a wearer.*

*31. The wader of claim 30, further comprising:*

*means for holding the body portion up when the chest portion is in the lowered position.*

*32. The wader of claim 31, wherein the means for holding the body portion up comprises a belt secured to an upper region of the body portion so as to hold said upper region against the wearer's body and thereby support the body portion.*

*33. The wader of claim 32, wherein the upper portion folds down and around the waist of said wearer, but remains adjacent the belt of the first portion when said upper portion is in the lowered position.*

*34. The wader of claim 32, wherein the second portion folds down and around the waist of said wearer, but remains above the belt of the first portion when said second portion is in the lowered position.*

*35. A waterproof wader garment, comprising:*

*a body portion for covering the feet, legs and waist of a wearer; and*

*a chest portion made of material thinner than that of said body portion, wherein said body portion is joined to said chest portion in a waterproof manner, and said chest portion is adapted to both fold downwardly in a lowered position around said wearer's waist, and to extend upwardly from said body portion over a wearer's chest area in a raised position.*

* * * * *